Aug. 2, 1955  A. A. KILLINGTON  2,714,419
ARM RESTS
Filed March 5, 1953  4 Sheets-Sheet 1
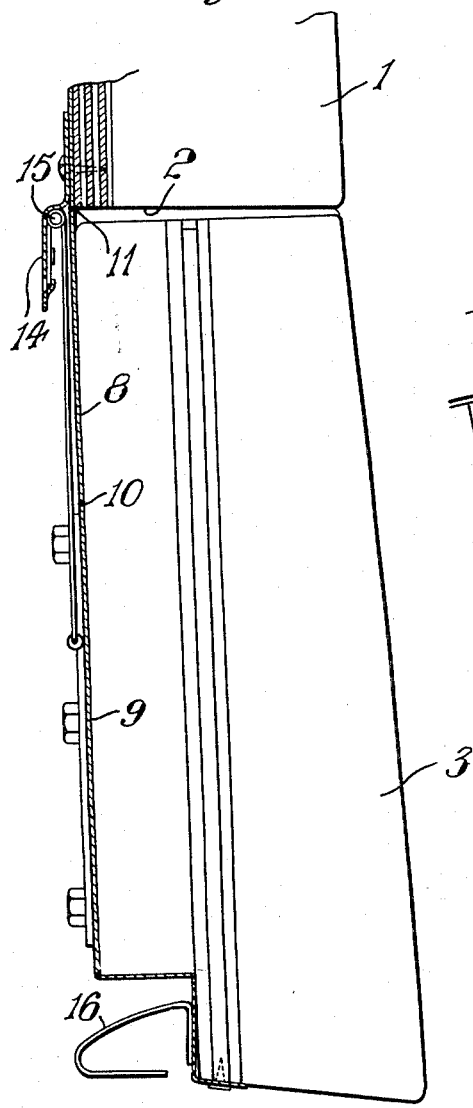
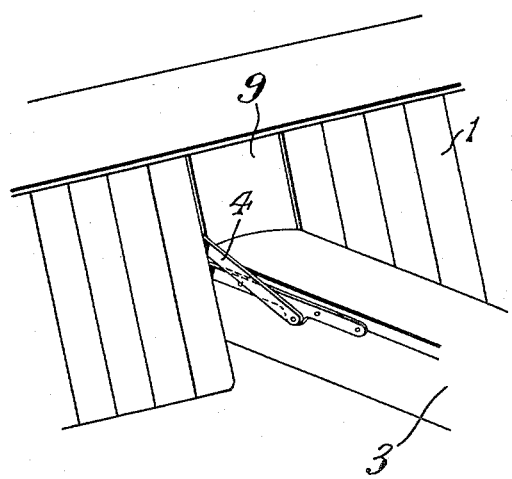
INVENTOR
Albert Arthur Killington
BY
Elmer Jamison Gray
ATTORNEY.

Aug. 2, 1955         A. A. KILLINGTON         2,714,419
                        ARM RESTS
Filed March 5, 1953                        4 Sheets-Sheet 2

INVENTOR
Albert Arthur Killington,
BY Elmer Jamison Gray
ATTORNEY.

Aug. 2, 1955    A. A. KILLINGTON    2,714,419
ARM RESTS
Filed March 5, 1953    4 Sheets-Sheet 3
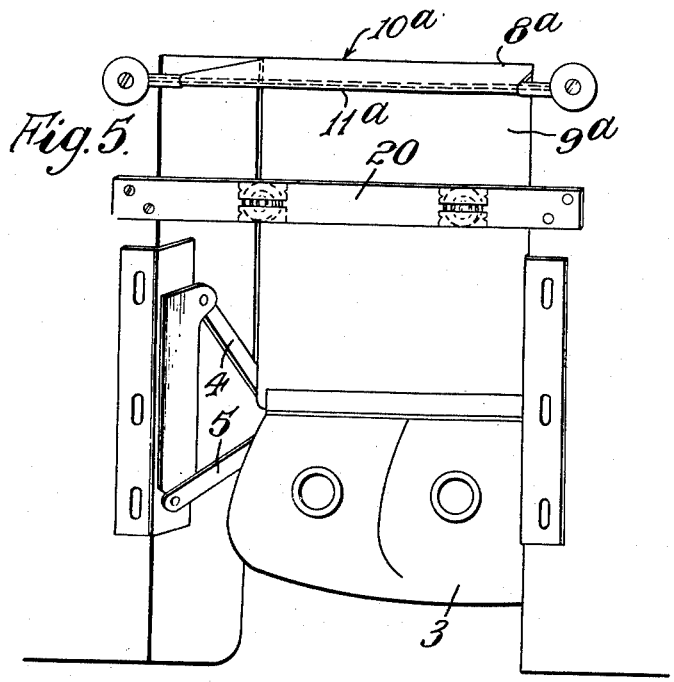
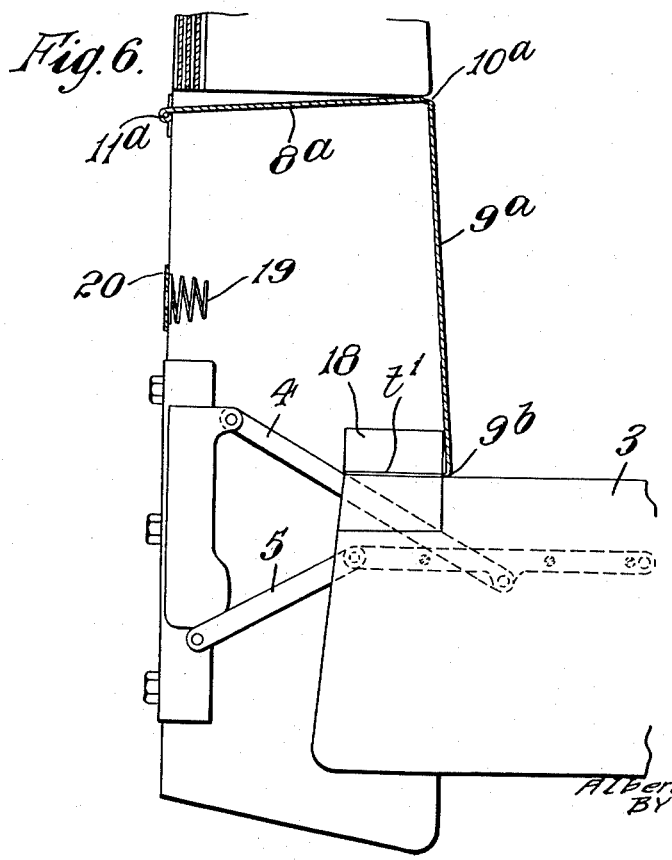
INVENTOR
Albert Arthur Killington.
BY Elmer Jamison Gray
ATTORNEY.

Aug. 2, 1955
A. A. KILLINGTON
2,714,419
ARM RESTS
Filed March 5, 1953
4 Sheets-Sheet 4
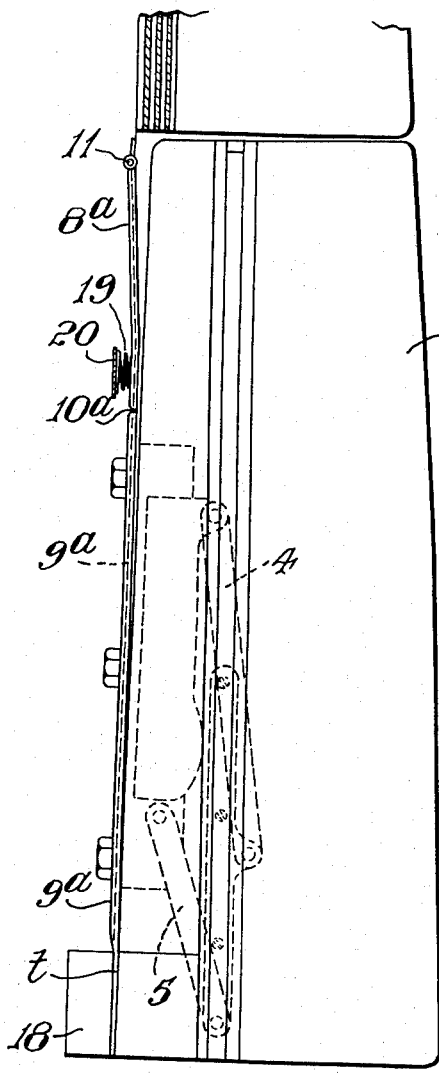
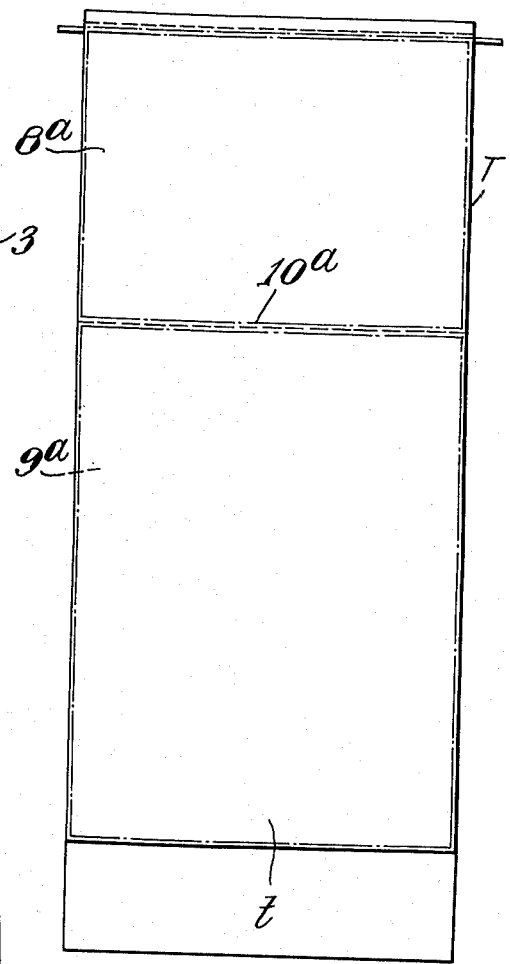
INVENTOR
Albert Arthur Killington.
BY
Elmer Jamison Gray
ATTORNEY.

ent Office 2,714,419
Patented Aug. 2, 1955

2,714,419

ARM RESTS

Albert Arthur Killington, Romford, England

Application March 5, 1953, Serial No. 340,466

6 Claims. (Cl. 155—112)

This invention relates to adjustable arm rests or supports of the kind which when in inoperative position are located in a recess and when in operative position extend outwardly of said recess. The invention is particularly but not necessarily applicable to arm rests for the seats of vehicles.

According to the present invention an adjustable arm rest or support of the kind referred to is provided with means which is automatically brought into position to extend across the open end of the recess and conceal it when the arm rest is moved from the recess into its operative position.

The said means may comprise hinged plate like members adapted to be urged by spring means into a position to conceal the open end of the recess. Alternatively they may be connected to part of the arm rest so as to be positively movable by the latter.

To enable the invention to be fully understood it will now be described with reference to the accompanying drawings, in which:

Fig. 1 is a side view partly in section showing an arm rest according to one embodiment of the invention, in inoperative position;

Fig. 2 is a perspective view showing the arm rest in operative position;

Fig. 5 is a rear perspective view of a modified form of the invention, the arm rest being shown in operative position;

Fig. 6 is a side view partly in section of the modification shown in Fig. 5;

Fig. 7 is a side view partly in section of the modification showing the arm rest in inoperative position; and Fig. 8 is a front view of the modified form of plate like members used for concealing the open end of the recess.

Figure 3:
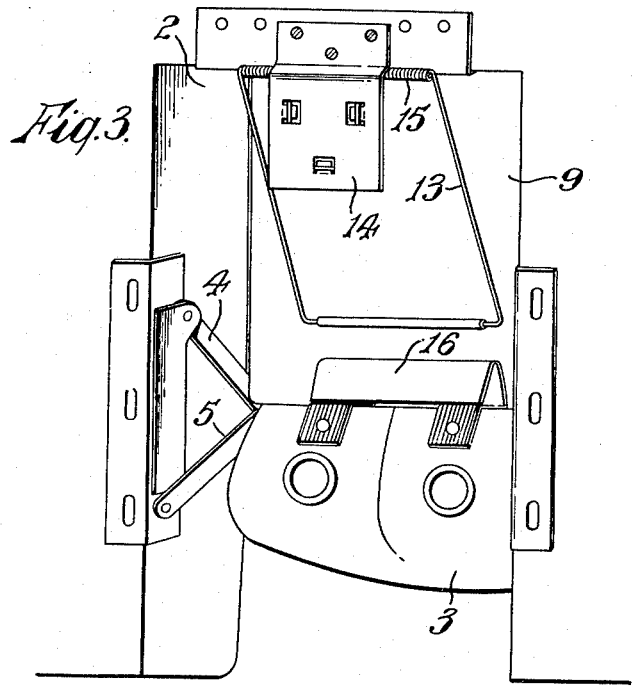
Fig. 3 is a rear perspective view of the arm rest.
Figure 4:
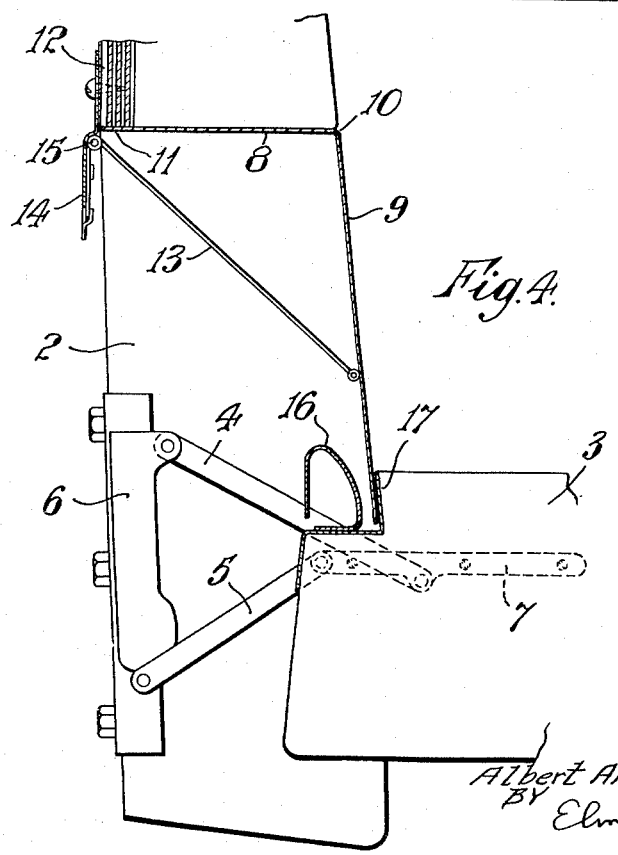
Fig. 4 is a side view partly in section showing the arm rest in operative position.

As shown in Figs. 1 to 4 of the accompanying drawings 1 indicates the back of a motor vehicle seat which is provided with a recess 2 in which is normally housed a padded arm rest 3, the arm rest being mounted for pivotal movement by means of pairs of links 4, 5 whose inner ends are pivoted to a plate 6 and whose outer ends are pivoted to an anchor strip 7 secured, as by screws, to the sides of the arm rest. It will be understood that a pair of links 4, 5 will be provided at each side of the arm rest. This arrangement permits the arm rest to be given a combined pivotal and vertical movement to permit it to be swung from the position shown in Fig. 1, outwardly of the recess and into its operative position shown in Figs. 2 to 4.

The arm rest is of substantially rectangular shape and the recess 2 is of similar shape so that the arm rest substantially fills the recess when it is in its inoperative position. Heretofore when the arm rest was moved into operative position the open end of the recess was left exposed and showed as a gap or hole which marred the general appearance of the seat back. The present invention provides means whereby the open end of the recess is automatically closed by a plate or the like which will be complementary in character to the adjoining parts of the back of the seat to simulate a complete unbroken appearance.

As shown in Figs. 1 to 4 a pair of plates 8, 9 are provided hinged or pivoted to one another at 10, the plate 8 being also hinged at 11 to a plate 12 which is secured to a support at the inner upper portion of the recess 2. The hinging of the plates 8 and 9 permits them to assume a straight line position as shown in Fig. 1, or to be pivoted at right angles to one another to the position shown more particularly in Fig. 4. A lever 13 is provided pivoted to a support 14 at the inner upper portion of the recess 2 and provided with spring means 15 adapted to urge the lever 13 outwardly.

When the arm rest 3 is located within the recess 2 its upper face will extend in a vertical direction and press against the plates 8, 9 to hold them in the position shown in Fig. 1, the lever 13 being forced inwardly against the action of the springs 15. As the arm rest is pulled down into its operative position it will be withdrawn from the recess 2 and the spring actuated lever will abut against the rear face of the plate 9 causing the latter and the plate 8 with which it is connected to be moved forwardly. The lower edge of the plate 9 will be engaged by the curved spring member 16 mounted on the inner end of the arm rest and will be guided into the space formed between the member 16 and the adjacent end face 17 of the arm rest. It will be understood that as the arm rest is lowered the plates 8 and 9 will be progressively moved forwardly until they assume the position shown in Fig. 4 where the plate 8 extends flush with the upper wall of the recess and the plate 9 extends downwardly from the outer end of the plate 8 over the recess 2 so as to conceal it. The plate 8 will preferably correspond in size to the upper wall of the recess and the plate 9 will be of such length and width as to extend across the portion of the recess between the upper edge thereof and the upper surface of the arm rest. Preferably the outer face of the plates will be covered by trim material matching that of the adjacent parts of the seat back 1 so as to simulate a seat back of unbroken appearance. When the arm rest is moved into inoperative position the end face 17 will engage the plate 9 and exert a leverage effecting a pivotal movement of the plates 8, 9 against the action of the spring means 15 thereby causing the plates to be folded back into straight line position at the rear of the recess 2.

In the modification shown in Figs. 5 and 8 the arm rest and its mounting is similar to that previously described but in this case a pair of plates 8ª, 9ª are provided pivoted to one another at 10ª. The plate 8ª is also pivoted at 11ª to a part at the upper inner portion of the recess 2 and the free end of the plate 9ª is pivotally or hingedly connected to the upper surface of the arm rest 3 at 9ᵇ. As shown the plates 8ª, 9ª are formed of cardboard or like material covered by trim material T having a free end portion *t* extending beyond the free edge of the plate 9ª. This end portion *t* is clamped by a member 18 to the arm rest so as to permit a pivotal or hinge movement of the adjacent free end of the plate 9ª. Part of the trim material at the junction of the plates 8ª, 9ª may also serve as the hinge connection for these plates. According to this modification the plates are positively moved by the arm rest as it moved into and out of operative position. Buffer springs 19, mounted on a transverse bar 20 are provided adjacent to the inner end of the recess to limit inward movement of the plates and also as a means for urging them forwardly at the initial movement of the arm rest into operative position. The member 18 also serves as a stop to prevent inward movement of the plate 9ª when the latter is in its forward position.

If desired the buffer springs 19 may be replaced by pads of foam rubber or other resilient material.

If desired the hinged connection between the adjacent edges of the plates in both embodiments of the invention may comprise strips of flexible or elastic material, for example portions of the trim material used to cover said plates.

It will be understood that instead of two separate plates 8, 9 and 8ª, 9ª being provided a single plate may be used weakened along a transverse line to divide it into two relatively movable plate like portions.

Although the invention is particularly described with reference to a seat for vehicles it may be adapted for other articles of furniture. Further the invention is not necessarily limited to arm rests as it might be applied to any member which is normally concealed in a recess of an article of furniture and is adapted to be withdrawn into operative position from said cavity.

I claim:

1. In a vehicle body structure, a seat back having an arm rest receiving recess therein, a swinging arm rest within said recess and adapted to swing outwardly therefrom to an operative arm supporting position, hinge means connecting said arm rest and structure, a cover plate of rigid material for said recess, when said arm rest is at the operative position said cover plate extends at a cover position from a hinged end adjacent an outer edge of said recess to a free end adjacent said arm rest, a swinging plate of rigid material adapted to swing within said recess, said swinging plate having a forward end pivoted on the hinged end of said cover plate and having a rearward end pivoted on said structure, and means yieldingly urging said cover plate to the cover position, said arm rest having portions engageable with said cover plate to force the latter into said recess upon swinging of said arm rest into said recess.

2. In a vehicle body structure, a seat back having an arm rest receiving recess therein, a swinging arm rest within said recess and adapted to swing outwardly therefrom to an operative arm supporting position, hinge means connecting said arm rest and structure, a cover plate of rigid material for said recess, when said arm rest is at the operative position said cover plate extends at a cover position from a hinged end adjacent an outer edge of said recess to a free end adjacent said arm rest, a swinging plate of rigid material adapted to swing within said recess, said swinging plate having a forward end pivoted on the hinged end of said cover plate and having a rearward end pivoted on said structure, a swinging lever pivoted on said structure adjacent the rearward end of said swinging plate and having a swinging end in sliding engagement with said cover plate, said lever extending angularly forward and toward said arm rest when said cover plate is at the cover position, and resilient means yieldingly urging the swinging end of said lever forwardly, said arm rest having portions engageable with said cover plate to force the latter into said recess upon swinging of said arm rest into said recess.

3. In a vehicle body structure, a seat back having an arm rest receiving recess therein, a swinging arm rest within said recess and adapted to swing outwardly therefrom to an operative arm supporting position, hinge means connecting said arm rest and structure, a cover plate of rigid material for said recess, when said arm rest is at the operative position said cover plate extends at a cover position from a hinged end adjacent an outer edge of said recess to a free end adjacent said arm rest, a swinging plate of rigid material adapted to swing within said recess, said swinging plate having a forward end pivoted on the hinged end of said cover plate and having a rearward end pivoted on said structure, said arm rest having portions engageable with said cover plate to force the latter into said recess upon swinging of said arm rest into said recess.

4. In a vehicle body structure, a seat back having an arm rest receiving recess therein, a swinging arm rest within said recess and adapted to swing outwardly and downwardly from said recess to an operative arm supporting position, hinge means connecting said arm rest to said structure, a pair of plates of rigid material pivotally connected together, one of said plates being also pivoted on said structure adjacent the upper inner portion of said recess to swing therein, when said arm rest is at the operative position said one plate extending forwardly adjacent the upper wall of said recess to the outer portion thereof and the other plate comprising a cover plate for said recess and extending downwardly from the outer end of said one plate to adjacent said arm rest, a swinging lever pivoted on said structure adjacent the inner upper portion of said recess to swing therein and having a lower swinging end in sliding engagement with the back surface of said cover plate, and resilient means yieldingly urging the swinging end of said lever forwardly, said arm rest having portions engageable with the front surface of said cover plate to force the latter rearwardly into said recess upon swinging of said arm rest into said recess.

5. The combination as set forth in claim 4 wherein when the arm rest is at the operative position the lower end of said cover plate extends to below a rear portion of said arm rest in the path of forward swinging movement of said cover plate, whereby such forward swinging is blocked, and said lever declines from adjacent the inner end of said one plate and subtends the angle between the pivotally connected plates to comprise substantially a triangular section with said plates.

6. The combination as set forth in claim 5 and comprising in addition means extending upwardly from said arm rest rearwardly of the lower end of said cover plate in the path of rearward swinging movement thereof when said arm rest is at the operative position, thereby to limit said rearward swinging.

References Cited in the file of this patent

UNITED STATES PATENTS

| 1,835,049 | Hottel | Dec. 8, 1931 |

FOREIGN PATENTS

| 284,491 | Great Britain | Feb. 2, 1928 |
| 327,905 | Great Britain | Apr. 17, 1930 |